(12) United States Patent
Tsunoda

(10) Patent No.: US 10,656,879 B2
(45) Date of Patent: May 19, 2020

(54) PRINTING APPARATUS AND PRINTING METHOD

(71) Applicant: SEIKO EPSON CORPORATION, Tokyo (JP)

(72) Inventor: Keisuke Tsunoda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/432,052

(22) Filed: Jun. 5, 2019

(65) Prior Publication Data

US 2019/0377522 A1 Dec. 12, 2019

(30) Foreign Application Priority Data

Jun. 8, 2018 (JP) .................................. 2018-110146

(51) Int. Cl.
*G06F 3/12* (2006.01)

(52) U.S. Cl.
CPC ............ *G06F 3/1205* (2013.01); *G06F 3/122* (2013.01); *G06F 3/1215* (2013.01); *G06F 3/1247* (2013.01); *G06F 3/1267* (2013.01); *G06F 3/1274* (2013.01)

(58) Field of Classification Search
None
See application file for complete search history.

(56) References Cited

U.S. PATENT DOCUMENTS

| | | | | |
|---|---|---|---|---|
| 2007/0076255 A1* | 4/2007 | Hamashima | .......... | G06F 3/1258 358/1.16 |
| 2009/0231620 A1* | 9/2009 | Kaneko | ................... | G06F 3/121 358/1.15 |
| 2017/0228197 A1* | 8/2017 | Watanabe | ............. | G06F 3/1237 |

FOREIGN PATENT DOCUMENTS

JP      2006-123428 A      5/2006

* cited by examiner

*Primary Examiner* — Frantz Bataille
(74) *Attorney, Agent, or Firm* — Workman Nydegger

(57) ABSTRACT

A printing apparatus includes a conversion section that retrieves a printing data stored into a storage section on a first-in first-out basis, and converts, for each set of n lines, n being a predetermined number larger than or equal to 1, the retrieved printing data into image data in accordance with a printing setting in order in which the printing data is retrieved; a deletion controller that, at timing when printing of the image data is started, deletes, from the storage section, converted printing data corresponding to the image data; and a printing setting controller that, when the printing setting is changed during the printing of the image data, causes the conversion section to convert converted printing data stored in the storage section, in accordance with the changed printing setting.

4 Claims, 11 Drawing Sheets

PRINTING APPARATUS AND PRINTING METHOD

The present application is based on, and claims priority from JP Application Serial Number 2018-110146, filed Jun. 8, 2018, the disclosure of which is hereby incorporated by reference herein in its entirety.

BACKGROUND

1. Technical Field

The present disclosure relates to a printing apparatus and a printing method.

2. Related Art

In printing apparatuses, there occurs a case in which printing settings are changed in the course of printing. There is known a printing apparatus capable of allowing changed printing settings to be reflected on printing (see JP-A-2006-123428). The printing apparatus described in JP-A-2006-123428 continues to retain printing data during a predetermined period even after the rasterization of the printing data. With this configuration, when the printing settings have been changed when the printing is ongoing, the printing apparatus described in JP-A-2006-123428 is capable of allowing the changed printing settings to be reflected without receiving the printing data again from a host computer by rasterizing the retained printing data using the changed printing settings.

In the printing apparatus described in JP-A-2006-123428, it is unnecessary to receive the printing data from the host computer again, however, in order to reflect the change of the printing settings on the result of the printing, it is necessary to perform the rasterization and the printing from an initial stage again. In a case in which the printing is started over again from initial printing data, an additional processing amount and an additional period of time are needed in the rasterization and the printing, as compared with a case in which the change of the printing settings is reflected in the course of the printing. It has been demanded to enable the change of the printing settings to be reflected in the course of the printing so as to minimize the additional processing amount and the additional period of time in the rasterization and the printing.

SUMMARY

The present disclosure has been made in order to solve the above problem, and a printing apparatus according to an aspect of the present disclosure includes: a first acquisition section that acquires first printing data; a first storage controller that causes the first printing data acquired by the first acquisition section to be stored into a first storage section; a first conversion section that retrieves, from the first storage section, the first printing data stored into the first storage section on a first-in first-out basis, and converts, for each set of n lines, n being a predetermined number larger than or equal to 1, the retrieved first printing data into first image data in accordance with a printing setting in order in which the first printing data is retrieved; a first deletion controller that, at timing when printing of the first image data is started, deletes, from the first storage section, converted first printing data corresponding to the first image data; and a first printing setting controller that, when the printing setting is changed during the printing of the first image data, causes the first conversion section to convert converted first printing data stored in the first storage section, in accordance with the changed printing setting.

Further, a printing method according to another aspect of the present disclosure includes: acquiring first printing data; causing the first printing data acquired in the acquiring first printing data to be stored into a first storage section; retrieving, from the first storage section, the first printing data stored into the first storage section on a first-in first-out basis, and converting, for each set of n lines, n being a predetermined number larger than or equal to 1, the retrieved first printing data into first image data in accordance with a printing setting in order in which the first printing data is retrieved; deleting, at timing when printing of the first image data is started, from the first storage section, converted first printing data corresponding to the first image data; and causing, when the printing setting is changed during the printing of the first image data, in the converting the retrieved first printing data, converted first printing data stored in the first storage section to be converted, in accordance with the changed printing setting.

DESCRIPTION OF EXEMPLARY EMBODIMENTS

First Embodiment

Hereinafter, an embodiment of the present disclosure will be described in detail with reference to the drawings.

Configuration of Printing Apparatus 1

Figure 1:
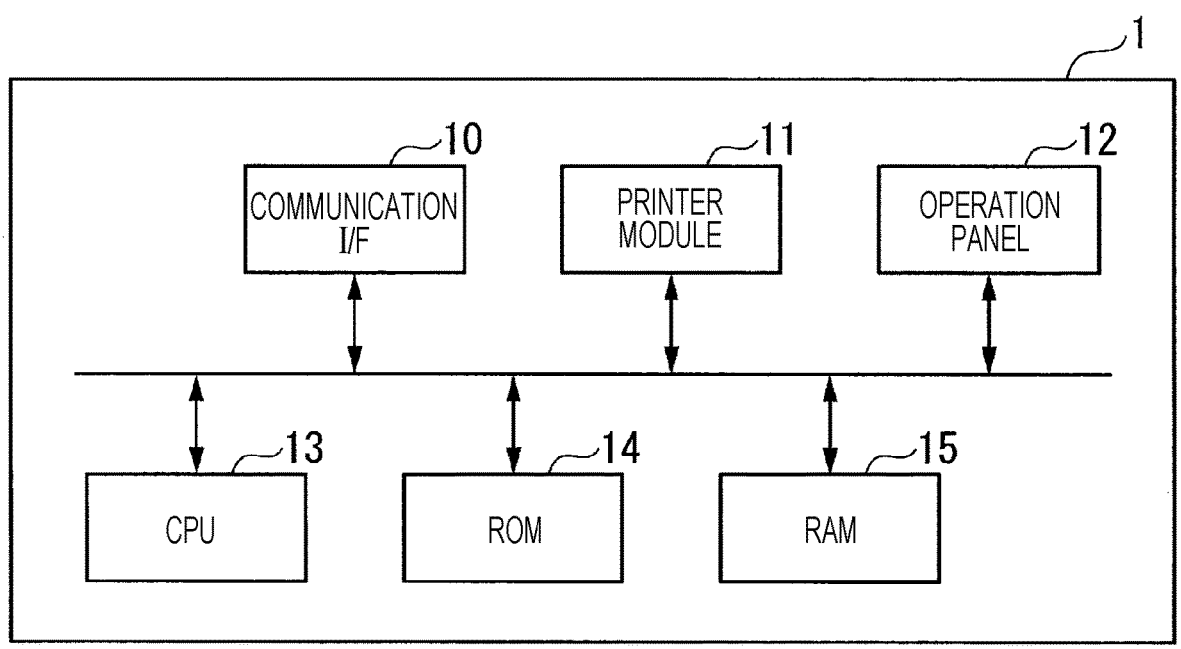
FIG. 1 is a diagram illustrating an example of the configuration of hardware of a printing apparatus according to a first embodiment of the present disclosure.

FIG. 1 is a diagram illustrating an example of the configuration of hardware of a printing apparatus 1, namely, a printing apparatus according to the present embodiment. The printing apparatus 1 is a serial impact dot matrix (SIDM) printer as an example. Note that the printing apparatus 1 may be an ink jet printer or a laser printer. Further, the printing apparatus 1 may be a printer employing a serial head, or may be a printer employing a line head.

The printing apparatus 1 includes a communication interface (I/F) 10, a printer module 11, an operation panel 12, a central processing unit (CPU) 13, a read only memory (ROM) 14, and a random access memory (RAM) 15.

The communication I/F 10 includes an interface for use in communication of the printing apparatus 1 with a host computer via a network. Here, the host computer transmits a printing execution signal to the printing apparatus 1 via the network. Here, the printing execution signal is a signal including printing data DP and printing setting information.

The printing data DP is data representing a text document and/or an image, as a printing target. The printing data DP includes data corresponding to one or more pages, and has a page break command at a separation point between the pages. Here, the page break command is a character string representing the separation point between the pages in the printing data DP.

The printing setting information is information representing printing settings. Here, the printing settings are settings in relation to, for example, a font, a pitch, a space between lines, a printing density, color printing, monochrome printing, a paper size, and the like.

Upon receipt of the printing execution signal, the printing apparatus 1 executes printing execution processing. The printing execution processing includes drawing processing and printing processing. The drawing processing (rasterization) is processing for converting the printing data DP into printing images IP. Here, the printing images IP are images obtained by converting the text document and/or the image, represented by the printing data DP, into bitmap images. The printing processing is processing for printing the printing images IP.

The printer module 11 executes the printing processing. The printer module 11 includes a recording mechanism for horizontally scanning an image and recording the image on paper. Further, the printer module 11 includes a transport mechanism for vertically transporting the paper on which the image is printed.

The operation panel 12 receives operations from users. The operations from users are operations for changing the printing settings. The operation panel 12 is, for example, a touch panel, and displays buttons corresponding to the operations from users.

The CPU 13 retrieves programs from the ROM 14, and executes various kinds of control in accordance with the retrieved programs. The CPU 13 incorporates a plurality of internal storage media, such as a register and the like. The CPU 13 temporarily stores data into one of the internal storage media from the ROM 14, and performs arithmetic processing on the data. The CPU 13 outputs the result of the arithmetic processing to the register, and further outputs the result of the arithmetic processing to the RAM 15 or an external storage medium from the register.

The ROM 14 is a main storage device storing various kinds of programs, data, and parameters for use in various kinds of arithmetic operations and control by the CPU 13. The ROM 14 is capable of retaining its storage content even in a state in which electric power supplied to the ROM 14 is zero.

The RAM 15 is a main storage device used by the CPU 13 as its working memory. The RAM 15 is subjected to writing and erasing of its programs, data, and the like by the CPU 13.

Figure 2:
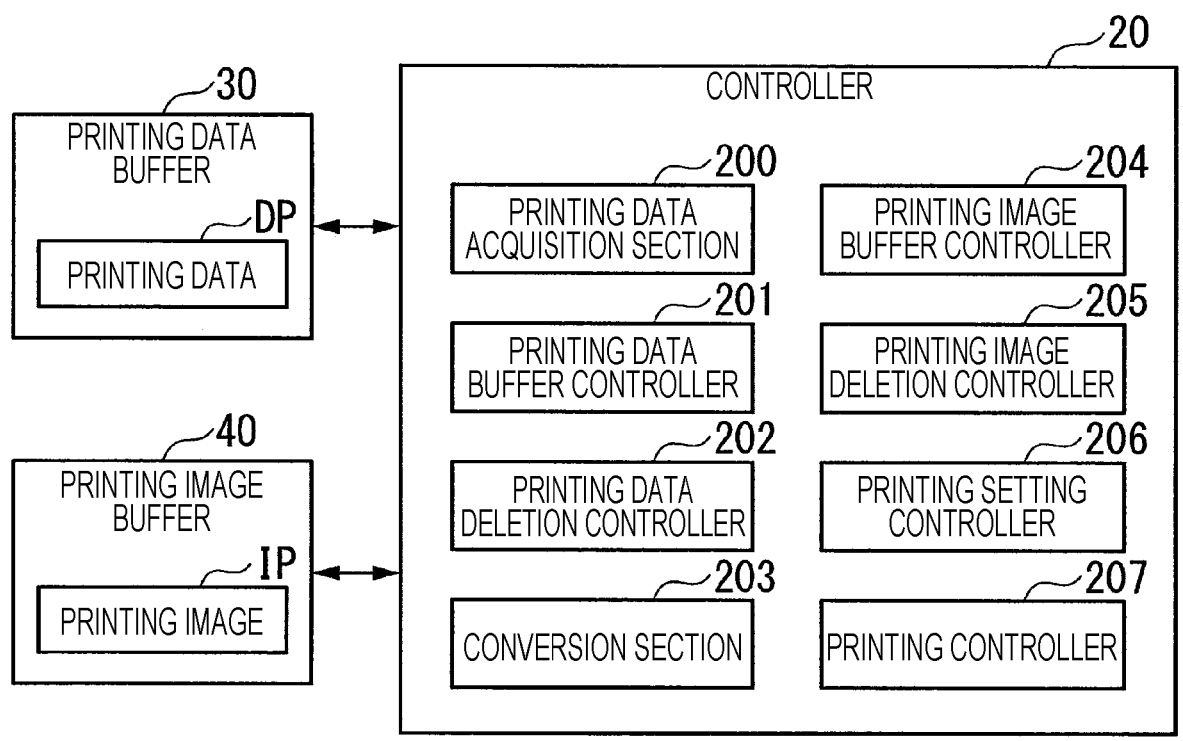
FIG. 2 is a diagram illustrating an example of the configuration of a controller according to the first embodiment of the present disclosure.

FIG. 2 is a diagram illustrating an example of the configuration of a controller 20, namely, a controller according to the present disclosure. The controller 20 includes a printing data acquisition section 200, a printing data buffer controller 201, a printing data deletion controller 202, a conversion section 203, a printing image buffer controller 204, a printing image deletion controller 205, a printing setting controller 206, and a printing controller 207.

The printing data acquisition section 200, the printing data buffer controller 201, the printing data deletion controller 202, the conversion section 203, the printing image buffer controller 204, the printing image deletion controller 205, the printing setting controller 206, and the printing controller 207 are modules that are each implemented by allowing the CPU 13 to retrieve the programs from the ROM 14 and execute processes. That is, the controller 20 is implemented by the CPU 13.

The printing data acquisition section 200 acquires the printing data DP having been received by the communication I/F 10. The printing data buffer controller 201 allows the printing data DP having been acquired by the printing data acquisition section 200 to be stored into a printing data buffer 30. The printing data deletion controller 202 deletes the printing data DP from the printing data buffer 30.

The conversion section 203 retrieves the printing data DP having been stored into the printing data buffer 30, on a first-in first-out basis. The conversion section 203 convers the retrieved printing data DP into printing images IP in accordance with the printing settings. Here, the conversion section 203 convers, for each set of n lines, the retrieved printing data DP into the printing images IP in order in which the printing data DP has been retrieved. Here, n is a predetermined number larger than or equal to 1. The above expression "for each set of n lines" means "in a unit corresponding to n lines among lines included in the text document represented by the printing data DP". Thus, one printing image IP corresponds to n lines of data in the printing data DP.

The printing image buffer controller 204 allows the printing images IP to be stored into a printing image buffer 40. The printing image deletion controller 205 deletes the printing images IP from the printing image buffer 40.

The printing setting controller 206 controls the printing settings for use in the processing that the conversion section 203 performs to convert the printing data DP into the printing images IP. The printing controller 207 controls the printing processing of the printing apparatus 1, through the printer module 11.

The printing data buffer 30 stores the printing data DP therein. The printing image buffer 40 stores the printing images IP therein. The printing data buffer 30 and the printing image buffer 40 are each implemented by the RAM 15.

Printing Processing

Figure 3:
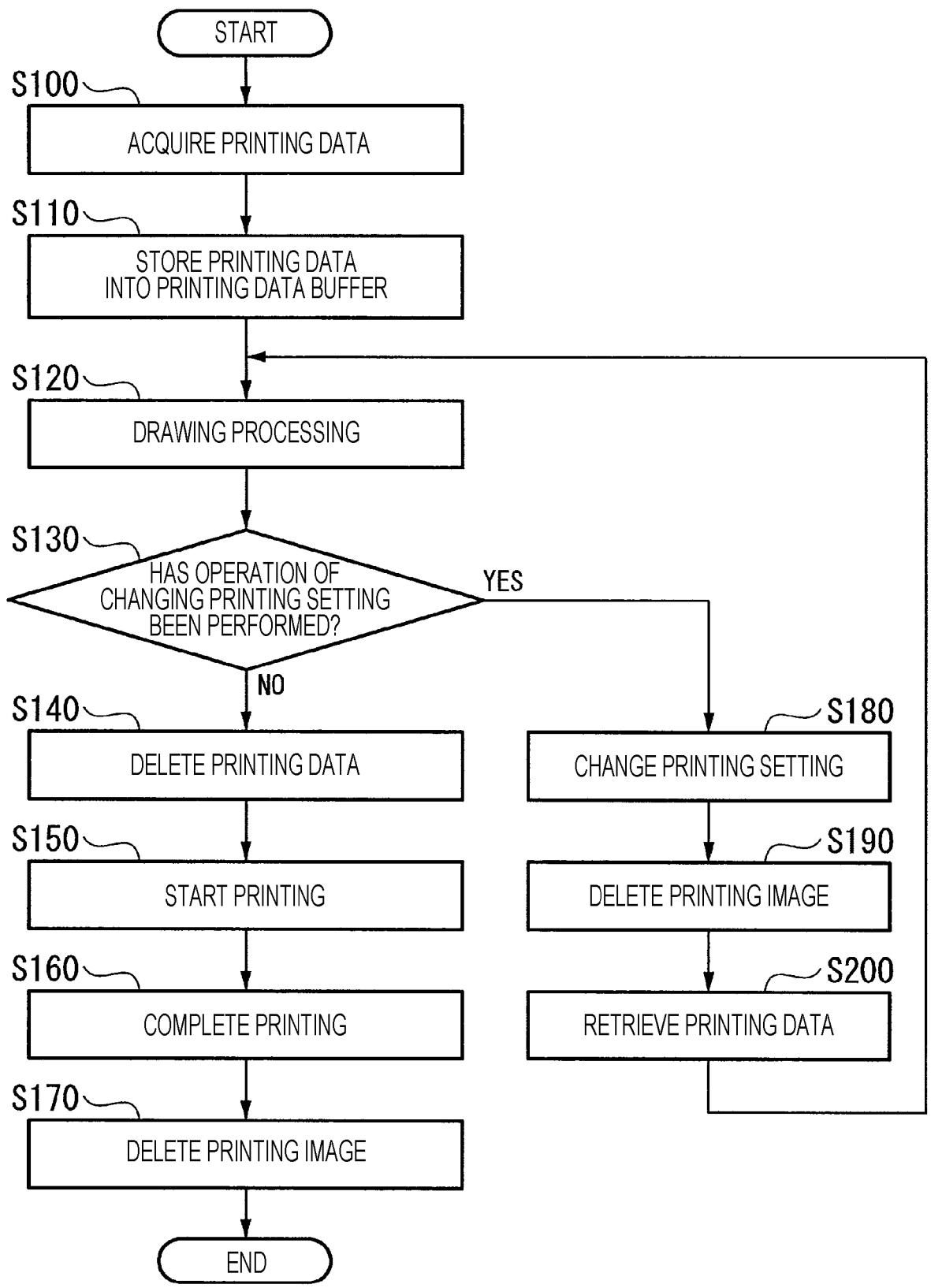
FIG. 3 is a diagram illustrating an example of printing processing according to the first embodiment of the present disclosure.

The printing processing of the printing apparatus 1 when the printing settings are changed in the course of the printing processing will be described with reference to FIG. 3. FIG. 3 is a diagram illustrating an example of the printing processing according to the present embodiment. The printing processing illustrated in FIG. 3 is started when the printing apparatus 1 has received printing data DP from the host computer via the communication I/F 10.

Step S100: the printing data acquisition section 200 acquires the printing data DP. Here, the printing data acquisition section 200 acquires the printing data DP by decoding a printing execution signal having been received from the host computer via the communication I/F 10. The printing data acquisition section 200 supplies the acquired printing data DP to the printing data buffer controller 201.

Step S110: the printing data buffer controller 201 allows the printing data DP having been supplied by the printing data acquisition section 200 to be stored into the printing data buffer 30. Here, the printing data buffer controller 201 allows the printing data DP to be stored into the printing data buffer 30 in order in which the printing data acquisition section 200 has acquired the printing data DP.

Step S120: the conversion section 203 performs the drawing processing. Here, the conversion section 203 retrieves the printing data DP, which is stored in the printing data buffer 30, from the printing data buffer 30 on a first-in first-out basis. The conversion section 203 convers, for each set of n lines, the retrieved printing data DP into a printing image IP in accordance with the printing settings in order in which the printing data DP has been retrieved.

The conversion section 203 supplies the printing image IP resulting from the conversion to the printing image buffer controller 204. The printing image buffer controller 204 allows the printing image IP having been supplied by the conversion section 203 to be stored into the printing image buffer 40. Thus, the printing image IP having been converted by the conversion section 203 is sequentially stored into the printing image buffer 40. Note that the individual processes in steps S100, S110, and S120 are performed without pause even during the execution of processes in step S130 and subsequent steps.

Step S130: the printing setting controller 206 determines whether or not an operation of changing the printing settings has been performed. Here, the printing setting controller 206 makes this determination by detecting the presence or absence of an operation of changing the printing settings that has been received through the operation panel 12.

When it is determined that the operation of changing the printing setting has been performed (step S130: YES), the printing setting controller 206 allows printing setting information indicating a printing setting corresponding to the detected operation to be stored into the RAM 15. Here, when printing setting information is already stored in the RAM 15, the printing setting controller 206 updates the stored printing setting information with the printing setting information indicating the printing setting corresponding to the detected operation. Thereafter, the printing setting controller 206 performs a process in step S180. In contrast, when the result of the above determination by the printing setting controller 206 is that no operation of changing the printing settings is performed (step S130: NO), the controller 20 performs a process in step S140.

Step S140: at timing when printing of the printing image IP is started, the printing data deletion controller 202 deletes printing data DP corresponding to the printing image IP from the printing data buffer 30. Here, the printing image IP corresponds to data associated with a set of n lines among the printing data DP, and the printing data DP is deleted for each set of n lines.

Step S150: the printing controller 207 starts the printing. Here, the printing controller 207 retrieves the printing image IP stored in the printing image buffer 40 from the printing image buffer 40 on a first-in first-out basis. The printing controller 207 performs the printing through the printer module 11 based on the retrieved printing image IP.

Step S160: the printing controller 207 completes the printing. Step S170: the printing image deletion controller 205 deletes, from the printing image buffer 40, one or more printing images IP, which are among the printing images IP stored in the printing image buffer 40 and for which the printing has been completed. Thereafter, the controller 20 terminates the printing processing.

Step S180: the printing setting controller 206 changes the printing settings. Here, the printing setting controller 206 changes the printing settings based on the printing setting information having been stored into the RAM 15 in step S130.

Step S190: the printing image deletion controller 205 deletes, from the printing image buffer 40, one or more printing images IP which are among the printing images IP having been stored into the printing image buffer 40 and for which the printing is not completed. Here, the process in step S190 is performed at timing when the printing settings have been changed when the printing of the printing image IP is ongoing. Thus, at the timing when the printing settings have been changed when the printing of the printing image IP is ongoing, the printing image deletion controller 205 deletes, from the printing image buffer 40, one or more printing images IP, which are stored into the printing image buffer 40 and which are not subjected to the printing.

Step S200: the conversion section 203 retrieves printing data DP from the printing data buffer 30 on a first-in first-out basis. In this respect, however, for printing data DP corresponding to printing images IP for which the printing has been already completed, the deletion of the relevant printing data DP from the printing data buffer 30 has been already made in step S140. Accordingly, the printing data DP to be retrieved by the conversion section 203 in step S200 is printing data DP for which the printing is not completed.

Thereafter, the process performed by the conversion section 203 proceeds to the process in step S120. Here, in the process in step S120, the printing setting controller 206 allows the conversion section 203 to convert printing data DP that is stored in the printing data buffer 30, in accordance with the changed printing settings. Accordingly, in a case in which the printing settings have been changed when the printing of an image IP is ongoing, the printing setting controller 206 allows the conversion section 203 to convert printing data DP that is stored in the printing data buffer 30, in accordance with the changed printing settings.

As described above, the printing apparatus 1 according to the present embodiment includes a first acquisition section (the printing data acquisition section 200), a first storage controller (the printing data buffer controller 201), a first conversion section (the conversion section 203), a first deletion controller (the printing data deletion controller 202), and a first printing setting controller (the printing setting controller 206).

The first acquisition section (the printing data acquisition section 200) acquires first printing data (printing data DP). The first storage controller (the printing data buffer controller 201) allows the first printing data (the printing data DP) having been acquired by the first acquisition section (the printing data acquisition section 200) to be stored into a first storage section (the printing data buffer 30).

The first conversion section (the conversion section 203) retrieves the first printing data (the printing data DP) having been stored into the first storage section (the printing data buffer 30), from the first storage section (the printing data buffer 30) on a first-in first-out basis, and converts, for each set of n lines, n being a predetermined number larger than or equal to 1, the retrieved first printing data (the printing data DP) into first image data (a printing images IP) in accordance with printing settings in order in which the first printing data (the printing data DP) has been retrieved.

At timing when the printing of the first image data (the printing image IP) has been started, the first deletion controller (the printing data deletion controller 202) deletes, from the first storage section (the printing data buffer 30), first printing data (printing data DP) corresponding to the first image data (the printing image IP).

In a case in which the printing settings have been changed when the printing of the first image data (the printing image IP) is ongoing, the first printing setting controller (the printing setting controller 206) allows the first conversion section (the conversion section 203) to convert first printing data (printing data DP) that is stored in the first storage section (the printing data buffer 30), in accordance with the changed printing settings.

With this configuration, the printing apparatus 1 according to the present embodiment is capable of performing printing in a way that allows the change of the printing settings to be made in the course of the printing processing because, at timing when the printing of the first image data (the printing image IP) has been started, the printing apparatus 1 is capable of deleting first printing data (printing data DP) corresponding to the first image data (the printing image IP) from the first storage section (the printing data buffer 30), and in a case in which the printing settings are changed when the printing of the first image data (the printing image IP) is ongoing, the printing apparatus 1 is capable of causing the first conversion section (the conversion section 203) to convert first printing data (printing data DP) that is stored in the first storage section (the printing data buffer 30), in accordance with the changed printing settings.

Further, a printing method according to the present embodiment includes a first acquisition process (step S100), a first storage control process (step S110), a first conversion process (step S120), a first deletion control process (step S140), a first printing setting control process (step S120 performed after step S180).

In the first acquisition process (step S100), first printing data (printing data DP) is acquired. In the first storage control process (step S110), the first printing data (the printing data DP) having been acquired in the first acquisition process (step S100) is stored into a first storage section (the printing data buffer 30). In the first conversion process (step S120), the first printing data (the printing data DP) having been stored into the first storage section (the printing data buffer 30) is retrieved from the first storage section (the printing data buffer 30) on a first-in first-out basis, and the retrieved first printing data (the printing data DP) is converted, for each set of n lines, n being a predetermined number larger than or equal to 1, into first image data (a printing images IP) in accordance with printing settings in order in which the first printing data (the printing data DP) has been retrieved. In the first deletion control process (step S140), at timing when the printing of the first image data (the printing image IP) has been started, first printing data (printing data DP) corresponding to the first image data (the printing image IP) is deleted from the first storage section (the printing data buffer 30).

In the first printing setting control process (in step S120 performed after step S180), in a case in which the printing settings are changed when the printing of the first image data (the printing image IP) is ongoing, first printing data (printing data DP) that is stored in the first storage section (the printing data buffer 30) is converted in accordance with changed printing settings in the first conversion process (step S120).

Second Embodiment

Hereinafter, a second embodiment of the present disclosure will be described in detail referring to the drawings. In the above first embodiment, there has been described the case in which the printing apparatus allows the change of the printing settings to be reflected from n lines subsequent to n lines for which printing is currently performed. In the present embodiment, there will be described a case in which a printing apparatus allows the change of the printing settings to be reflected for each page.

Configuration of Printing Apparatus 1a

Figure 4:
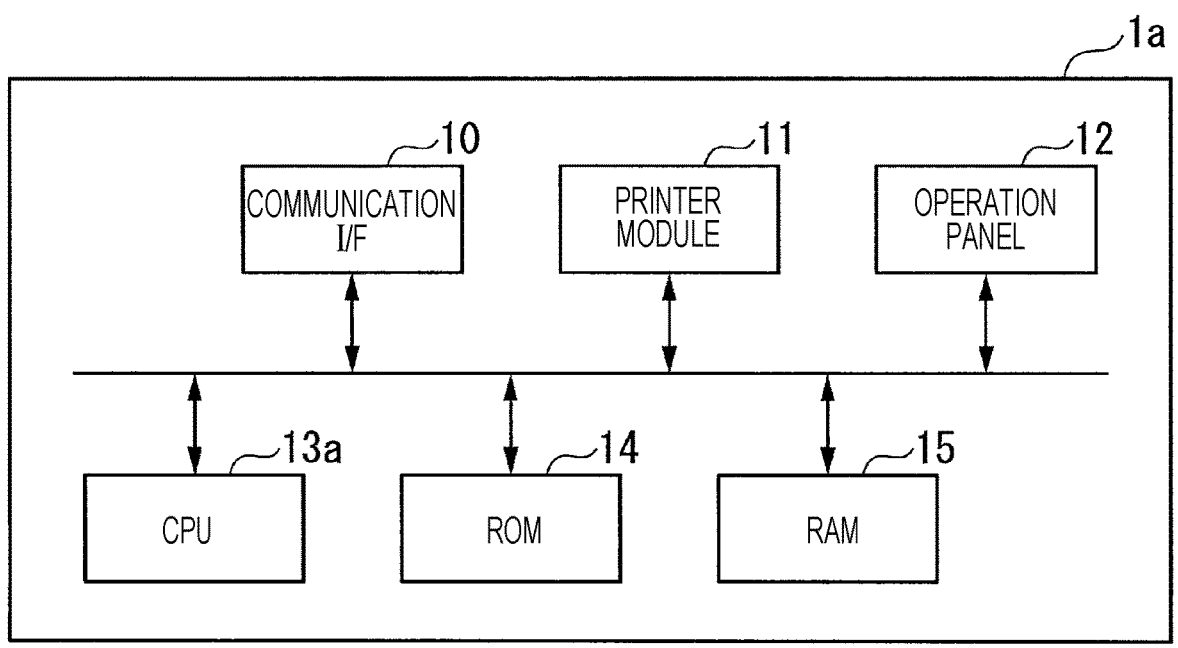
FIG. 4 is a diagram illustrating an example of the configuration of hardware of a printing apparatus according to a second embodiment of the present disclosure.

The printing apparatus 1 according to the present embodiment will be referred to as a printing apparatus 1a. FIG. 4 is a diagram illustrating an example of the configuration of hardware of the printing apparatus 1a according to the present embodiment. In comparison of the printing apparatus 1a (FIG. 4) according to the present embodiment with the printing apparatus 1 (FIG. 1) according to the first embodiment, a CPU 13a is different. Here, the functions of the other components (the communication I/F 10, the printer module 11, the operation panel 12, the ROM 14, and the RAM 15) are the same as the functions of those in the first embodiment. Note that, in the components of FIG. 4, components common to components of the first embodiment are denoted by the same reference signs as those of the components of the first embodiment.

A controller of the printing apparatus 1a is implemented by the CPU 13a. Thus, for the printing apparatus 1a according to the present embodiment and the printing apparatus 1 according to the first embodiment, there is a difference in the configuration of the controller. The description of functions that are the same as those of the first embodiment will be omitted, and in the second embodiment, description focusing on points different from the first embodiment will be made.

Figure 5:
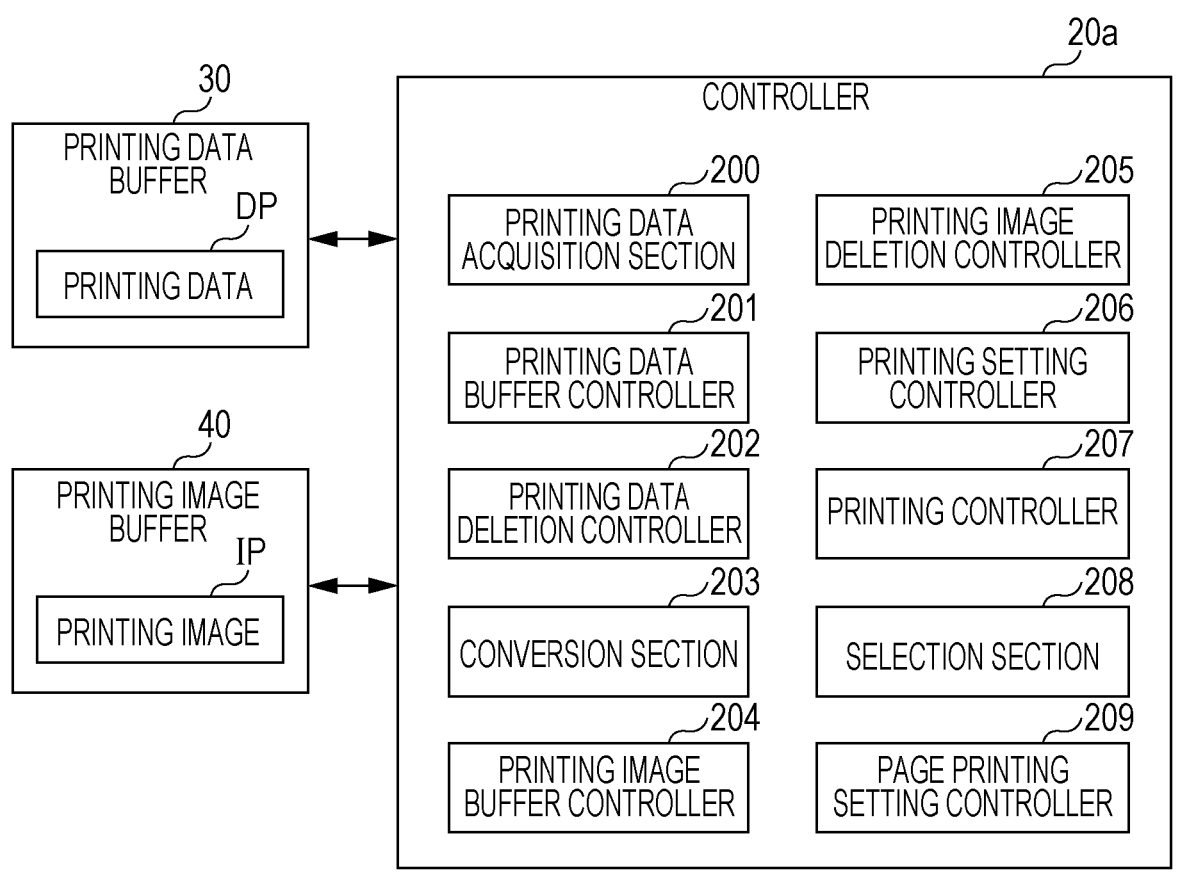
FIG. 5 is a diagram illustrating an example of the configuration of a controller according to the second embodiment of the present disclosure.

The configuration of a controller 20a, namely, a controller of the printing apparatus 1a, will be described with reference to FIG. 5. FIG. 5 is a diagram illustrating an example of the configuration of the controller 20a according to the present embodiment. In comparison of the controller 20a (FIG. 5) according to the present embodiment with the controller 20 (FIG. 2) according to the first embodiment, the controller 20a further includes a selection section 208 and a page printing setting controller 209. Here, the functions of the other components (the printing data acquisition section 200, the printing data buffer controller 201, the printing data deletion controller 202, the conversion section 203, the printing image buffer controller 204, the printing image deletion controller 205, the printing setting controller 206, and the printing controller 207) are the same as the functions of those in the first embodiment. Note that, in the components of FIG. 5, components common to components of the first embodiment are denoted by the same reference signs as those of the components of the first embodiment.

The selection section 208 selects a setting-change for-each-page enabled mode and a setting-change for-each-set-of-n-lines enabled mode. Here, the setting-change for-each-page enabled mode is a mode in which the printing settings can be changed for each page. The setting-change for-each-set-of-n-lines enabled mode is a mode in which the printing settings can be changed for each set of n lines. The selection section 208 selects either the setting-change for-each-page enabled mode or the setting-change for-each-set-of-n-lines enabled mode based on a selecting operation received by the operation panel 12. The page printing setting controller 209 controls, for each page, the printing settings for use in the processing in which the conversion section 203 converts the printing data DP into the printing images IP.

Printing Processing

Figure 6:
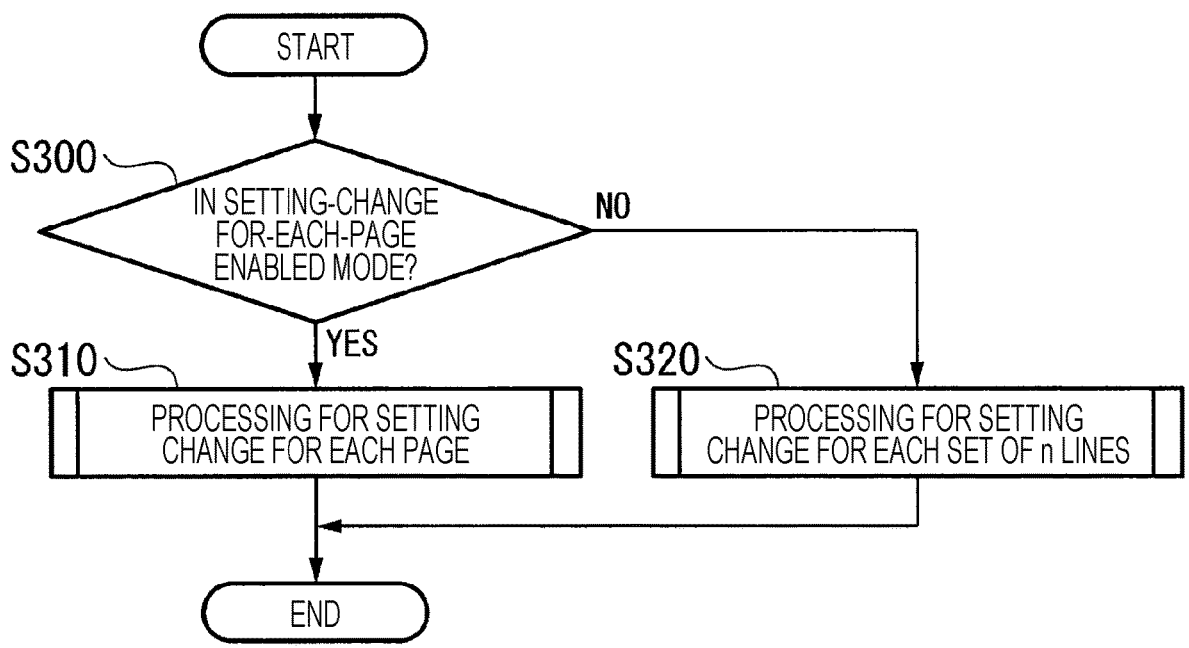
FIG. 6 is a diagram illustrating an example of processing for selecting a setting change mode, according to the second embodiment of the present disclosure.

FIG. 6 is a diagram illustrating an example of processing for selecting a setting change mode, according to the present embodiment. The processing illustrated in FIG. 6 is started when the printing apparatus 1 has received the printing data DP from the host computer through the communication I/F 10.

Note that, before the processing illustrated in FIG. 6 is started, the selection section 208 selects in advance a setting change mode, that is, either the setting-change for-each-page enabled mode or the setting-change for-each-set-of-n-lines enabled mode based on a selecting operation received by the operation panel 12. Here, the selection of a setting change mode by the selection section 208 means that the selection section 208 stores setting change mode information indicating the setting change mode into the RAM 15.

Step S300: the page printing setting controller 209 determines whether or not the setting-change for-each-page enabled mode is selected as the setting change mode. Here, the page printing setting controller 209 retrieves the setting change mode information stored in the RAM 15, and makes the determination based on the retrieved setting change mode information.

When the result of the determination by the page printing setting controller 209 is that the setting-change for-each-page enabled mode is selected as the setting change mode (step S300: YES), the controller 20 performs a process in step S310. In contrast, when the result of the determination by the page printing setting controller 209 is that the setting-change for-each-page enabled mode is not selected as the setting change mode (step S300: NO), the controller 20 performs a process in step S320.

The details of the process in step S310 will be described with reference to FIGS. 7 to 11. The process in step S320 is the same as the printing processing of FIG. 3. That is, when the setting-change for-each-set-of-n-lines enabled mode has been selected by the selection section 208, the printing apparatus 1a allows the printing setting controller 206 to reflect, for each set of n lines, the change of the printing settings. The process in step S320 is the same as the printing processing of FIG. 3, and thus, will be omitted from the following description.

Here, the outline of processing for a setting change for each page will be described with reference to FIGS. 7 to 10. In FIGS. 7 to 10, printing data DP1, printing data DP2, and printing data DP3 are respectively, in this order, data corresponding to a first page, data corresponding to a second page, and data corresponding to a third page, in the printing data DP. In FIGS. 7 to 10, an operation of changing the printing settings is performed when the printing of the printing data DP1 corresponding to the first page is ongoing, and the changed printing settings are reflected from the printing of the printing data DP3 corresponding to the third page.

Figure 7:
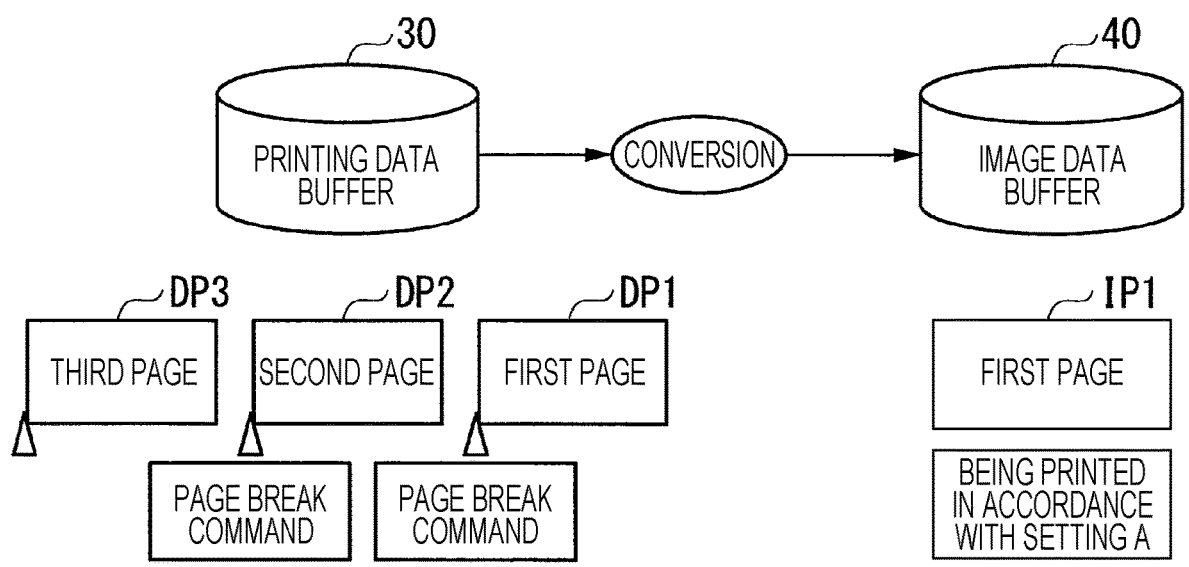
FIG. 7 is a diagram illustrating an example of processing for a setting change for each page, according to the second embodiment of the present disclosure.

FIG. 7 is a diagram illustrating an example of the processing for the setting change for each page, according to the present embodiment. In the printing apparatus 1a, printing based on the printing data DP1 is ongoing in accordance with settings A, namely, pre-change printing settings. In the setting-change for-each-page enabled mode, the conversion section 203 stores printing images IP1, namely, one page of printing images corresponding to the printing data DP1, into the printing image buffer 40. Note that the conversion section 203 does not start the conversion processing on the printing data DP2 until the completion of the printing based on the printing data DP1.

When the operation panel 12 has received an operation of changing the printing settings in the course of the printing processing based on the printing data DP1, the change of the printing settings is not reflected on the printing data DP1, and the printing is continued in accordance with the pre-change settings A.

Here, the printing setting controller 206 changes a printing setting state from an initial state to a page break monitoring state. The printing setting state is a state that is referred to for the purpose of controlling processing for changing the printing settings. A status in which the printing setting state is in the page break monitoring state is a status in which processing for detecting a page break command from printing data DP having been retrieved from the printing data buffer 30 is performed during the execution of the drawing processing. A status in which the printing setting state is in the initial state is a status in which the processing for changing the printing settings is not performed.

The printing data deletion controller 202 deletes the printing data DP1, and starts printing processing on the printing images IP1 corresponding to the printing data DP1. Here, the printing data deletion controller 202 also deletes a page break command located at the end of the printing data DP1 corresponding to the first page. When the printing data deletion controller 202 has completed the printing processing on the printing images IP1 corresponding to the printing data DP1 associated with the first page, the printing image deletion controller 205 deletes the printing images IP1.

Figure 8:
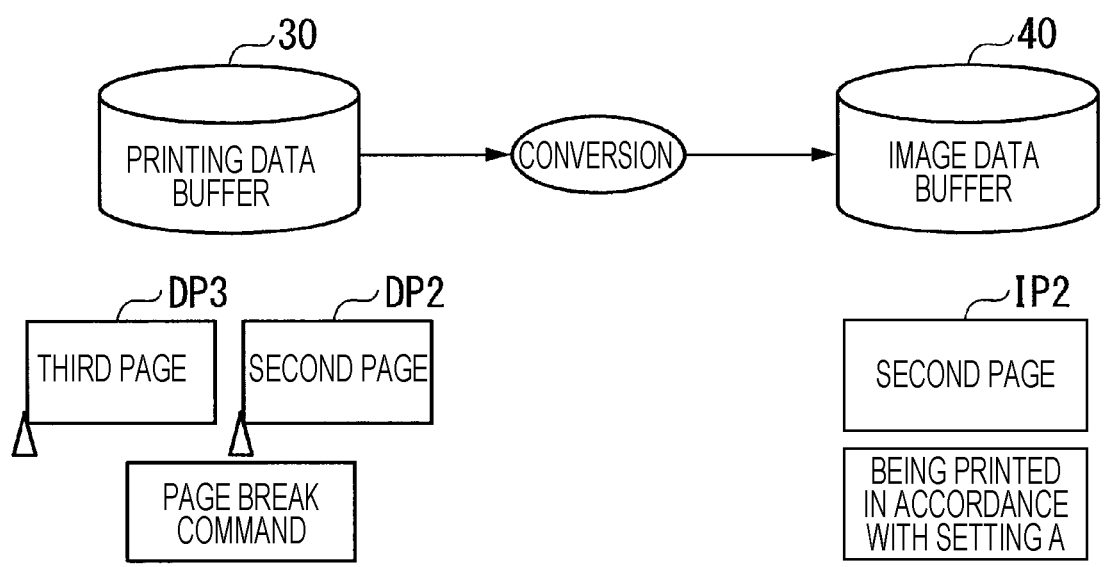
FIG. 8 is a diagram illustrating an example of the processing for the setting change for each page, according to the second embodiment of the present disclosure.

FIG. 8 is a diagram illustrating an example of the processing for the setting change for each page, according to the present embodiment. The conversion section 203 converts the printing data DP2 corresponding to the second page into printing images IP2. The printing data deletion controller 202 allows the printing images IP2 resulting from the conversion to be stored into the printing image buffer 40, and the printing controller 207 starts the printing.

When the printing setting state is in the page break monitoring state, the conversion section 203 reads a page break command located at the end of the printing data DP2 as second page during the conversion of the printing data DP2 corresponding to the second page. When the conversion section 203 has read the page break command, the page printing setting controller 209 changes the printing setting state into a reserved state. Here, a status in which the printing setting state is in the reserved state is a status in which a printing setting change is to be made after the completion of the printing performed for each page. Because of the change of the printing setting state into the reserved state, the printing data DP3 corresponding to the third page and subsequent printing data are converted in accordance with settings B, namely, post-change printing settings.

Figure 9:
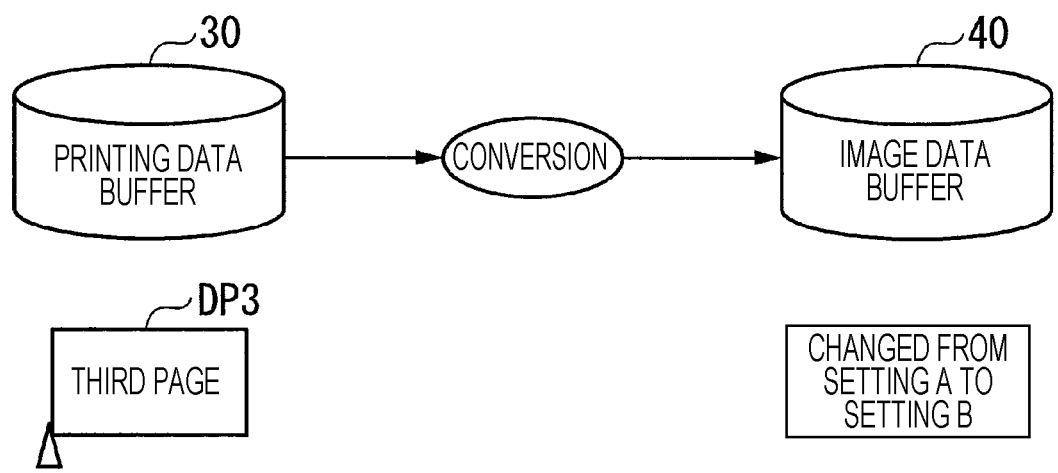
FIG. 9 is a diagram illustrating an example of the processing for the setting change for each page, according to the second embodiment of the present disclosure.

FIG. 9 is an example of the processing for the setting change for each page, according to the present embodiment. The printing data deletion controller 202 deletes the printing data DP2, and starts printing processing on the printing images IP2 corresponding to the printing data DP2. When the printing data deletion controller 202 has completed the printing processing on the printing images IP2 corresponding to the printing data DP2 associated with the second page, the printing image deletion controller 205 deletes the printing images IP2. The page printing setting controller 209 changes the printing settings from the settings A to the settings B because the printing setting state is in the reserved state.

Figure 10:
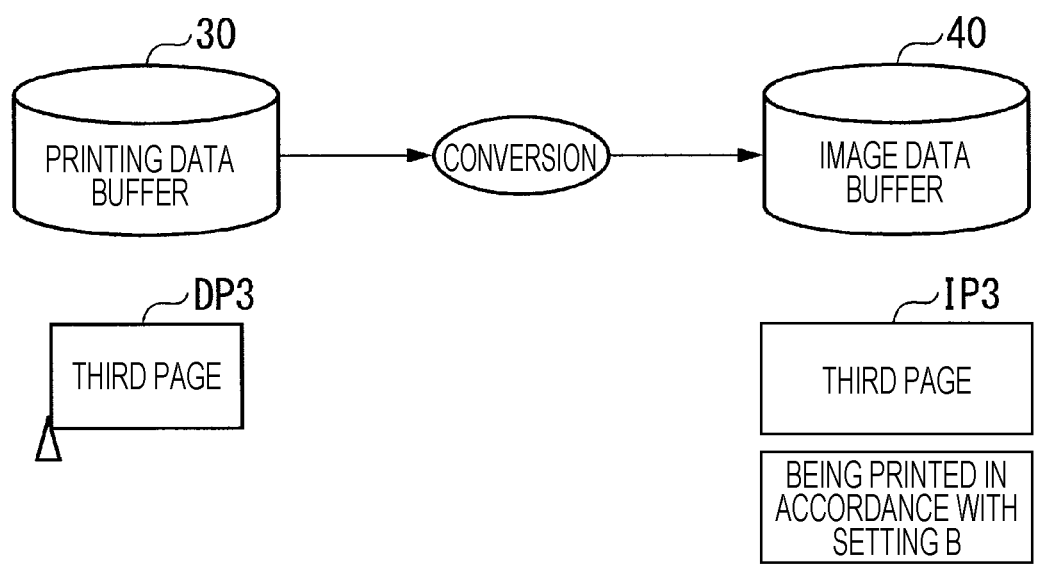
FIG. 10 is a diagram illustrating an example of the processing for the setting change for each page, according to the second embodiment of the present disclosure.

FIG. 10 is an example of the processing for the setting change for each page, according to the present embodiment. The conversion section 203 converts the printing data DP3 corresponding to the third page into printing images IP3. Here, when converting the printing data DP3 corresponding to the third page, the conversion section 203 converts the printing data DP3 corresponding to the third page in accordance with settings B namely, post-change printing settings. The printing data deletion controller 202 allows the printing images IP3 resulting from the conversion to be stored into the printing image buffer 40, and the printing controller 207 starts the printing processing.

Here, the details of the processing for the setting change for each page will be described with reference to FIG. 11.

Figure 11:
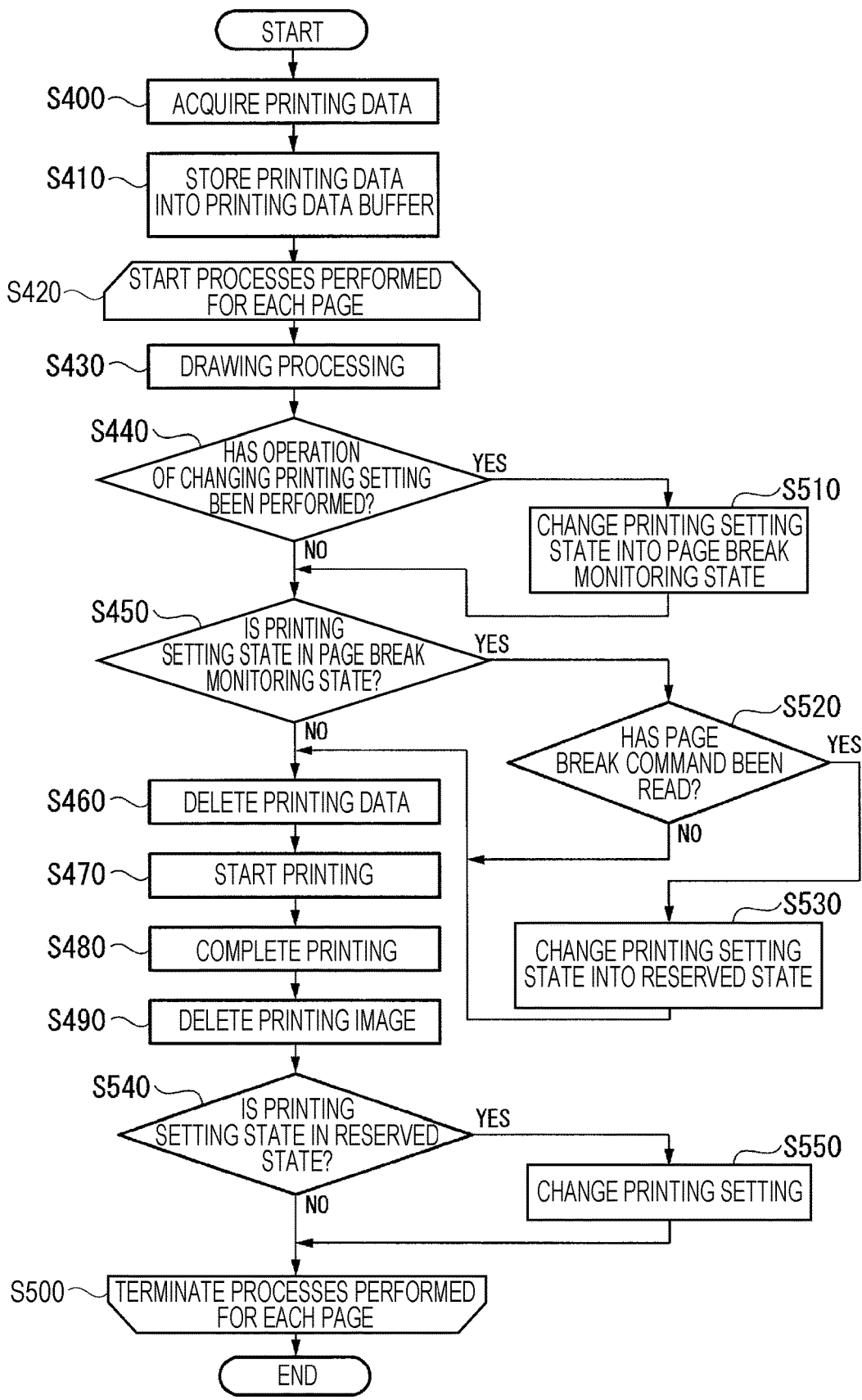
FIG. 11 is a diagram illustrating an example of printing processing according to the second embodiment of the present disclosure.

FIG. 11 is a diagram illustrating an example of the printing processing according to the present embodiment. The printing processing illustrated in FIG. 11 corresponds to step S310 of FIG. 6. Here, individual processes in steps S400, S410, S430, S440, S460, S470, S480, and S490 are the same as the individual processes in steps S100, S110, S120, S130, S140, S150, S160, and S170, which are illustrated in FIG. 3, except that the former processes are performed for each page, and thus, the former processes will be omitted from the following description.

Step S420: the controller 20 starts processes that are performed for each page. Step S430: the process in step S430 is the same as the process in step S120 in FIG. 3 except that the conversion section 203 does not start the conversion processing on the printing data DP2 until the completion of the printing based on the printing data DP1. Step S450: the printing setting controller 206 determines whether or not the printing setting state is in the page break monitoring state.

When the result of the determination by the printing setting controller 206 is that the printing setting state is in the page break monitoring state (step S450: YES), the printing setting controller 206 performs a process in step S520. In contrast, when the result of the determination by the printing setting controller 206 is that the printing setting state is not in the page break monitoring state (step S450: NO), the controller 20 performs the process in step S460. Step S500: the controller 20 terminates the processes that are performed for each page.

Step S510: the printing setting controller 206 changes the printing setting state into the page break monitoring state. Here, when the result of the determination in step S440 is that the printing settings have been changed, the printing setting controller 206 changes the printing setting state into the page break monitoring state. Thereafter, the printing setting controller 206 performs the process in step S450.

Step S520: the page printing setting controller 209 determines whether or not a page break command has been read. Here, the page printing setting controller 209 detects the presence or absence of a page break command from printing data DP having been retrieved from the printing data buffer 30 in step S430, and thereby determines whether or not the page break command is included in the printing data DP. When the result of the determination by the page printing setting controller 209 is that the page break command has been read (step S520: YES), the page printing setting controller 209 performs a process in step S530. In contrast, when the result of the determination by the page printing setting controller 209 is that the page break command is not read (step S520: NO), the controller 20 performs the process in step S460.

Step S530: the page printing setting controller 209 changes the printing setting state into the reserved state. Thereafter, the controller 20 performs the process in step S460.

Step S540: the page printing setting controller 209 determines whether or not the printing setting state is in the reserved state. When the result of the determination by the page printing setting controller 209 is that the printing setting state is in the reserved state (step S540: YES), the page printing setting controller 209 performs a process in step S550. In contrast, when the result of the determination by the page printing setting controller 209 is that the printing setting state is not in the reserved state (step S540: NO), the controller 20 repeats the processes that are performed for each page.

Step S550: the page printing setting controller 209 changes the printing settings. Here, the page printing setting controller 209 makes this change based on the printing setting information having been stored into the RAM 15 in step S440. The process in step S440 is the same as the process in step S130 in FIG. 3. After the change of the printing settings, the page printing setting controller 209 releases the printing setting state from the reserved state, and returns the printing setting state to the initial state.

As described above, when the setting-change for-each-page enabled mode has been selected by the selection section 208, the page printing setting controller 209 detects the page break command from the printing data DP stored in the printing data buffer 30, and allows the change of the printing settings to be reflected from a page subsequent to the detected page break command.

Note that, in the present embodiment, there has been described the case in which the page printing setting controller 209 detects the page break command from the printing data DP having been retrieved from the printing data buffer 30 in step S430, but the present disclosure is not limited to the above case. The page printing setting controller 209 may detect the page break command from printing data DP that is among the printing data DP stored in the printing data buffer 30 and that has been converted into the printing images IP.

Note that, in the present embodiment, there has been described the case in which the individual processes in steps S400, S410, S430, S440, S460, S470, S480, and S490 are performed for each page, but the present disclosure is not limited to the above case. The individual processes in steps S400, S410, S430, S440, S460, S470, S480, and S490 may be performed for each set of n lines.

As described above, the printing apparatus 1a according to the present embodiment includes a first selection section (the selection section 208) and a second printing setting controller (the page printing setting controller 209).

The first selection section (the selection section 208) makes a selection with respect to a first printing setting change mode (the setting-change for-each-set-of-n-lines enabled mode) in which the printing settings can be changed for each set of n lines and a second printing setting change mode (the setting-change for-each-page enabled mode) in which the printing settings can be changed for each page.

When the second printing setting change mode (the setting-change for-each-page enabled mode) has been selected by the first selection section (the selection section 208), the second printing setting controller (the page printing setting controller 209) detects the page break command from first printing data (printing data DP) stored in the first storage section (the printing data buffer 30), and allows the change of the printing settings to be reflected from a page subsequent to the detected page break command.

When the first printing setting change mode (the setting-change for-each-set-of-n-lines enabled mode) has been selected by the first selection section (the selection section 208), the printing apparatus 1a allows the first printing setting controller (the printing setting controller 206) to reflect, for each set of n lines, the change of the printing settings.

With this configuration, in the printing apparatus 1a according to the present embodiment, the change between a mode in which the change of the printing settings is reflected for each set of n lines and a mode in which the change of the printing settings is reflected for each page can be made in response to a selected printing setting change mode, and thus, the printing can be performed in a way that allows the change of the printing settings for each set of n lines or the change of the printing settings for each page to be made in the course of the printing processing.

Note that, in the individual embodiments described above, there have been described the case in which the printing execution signal includes the printing setting information, but the present disclosure is not limited to the above case. The printing setting information may not be included in the printing execution signal, but may be stored in, for example, the RAM 15. When the printing setting information is stored in the RAM 15, the printing setting information stored in the RAM 15 is changed based on an operation of changing the printing settings that is received by the operation panel 12.

Further, in the individual embodiments described above, there has been described the case in which an operation of changing the printing settings is received by the operation panel 12, but the present disclosure is not limited to the above case. The printing apparatus 1 may receive the printing execution signal in the course of printing processing, and may change the printing settings based on printing setting information included in the received printing execution signal.

Note that a portion of the printing apparatus 1 or the printing apparatus 1a in the embodiments described above, that is, for example, the controller 20, may be configured by a computer. In this case, the above configuration may be implemented by allowing a program for implementing the control function thereof to be recorded in a computer readable recording medium, and allowing a computer system to retrieve and execute the program recorded in the recording medium. Note that the "computer system" mentioned herein is a computer system incorporated in the printing apparatus 1 or the printing apparatus 1a and including an OS and hardware such as peripheral devices and the like. Further, the "computer readable recording medium" means a portable medium, such as a flexible disc, a magneto optical disc, a ROM, a CD-ROM or the like, or a storage device incorporated in the computer system, such as a hard disc or the like. Moreover, the "computer readable recording medium" may also include, not only means for dynamically retaining the program during a short period of time, such as a communication line, in a case in which the program is transmitted via a network such as the Internet or the like, or a communication link such as a telephone link or the like, but also means for retaining the program during a certain length of time, such as a volatile memory inside a computer system constituting a server or a client, in the above case. Furthermore, the above program may be a program for implementing part of the aforementioned functions, and further may be a program capable of implementing the aforementioned functions in combination with one or more programs that are already recorded in the computer system.

Further, part or the whole of the printing apparatus 1 or the printing apparatus 1a in the embodiments described above may be constituted as an integrated circuit such as a large scale integration (LSI) or the like. Each of the function blocks of the printing apparatus 1 or the printing apparatus 1a may be separately integrated into a processor, or part or the whole of the function blocks of the printing apparatus 1 or the printing apparatus 1a may be integrated into a processor. Further, the means for integrating into circuits may be implemented by a dedicated circuit or a general-purpose processor without being limited to the LSI. Further, when, with the advance of technology for semiconductors, technology for integrating into circuits in substitution for the LSI has appeared, an integrated circuit obtained by using the relevant technology may be employed.

Heretofore, the example embodiments of the present disclosure have been described in detail with reference to the drawings, but specific configurations are not limited to the above-described example embodiments, and various design changes or the like can be made within the scope not departing from the gist of the present disclosure.

What is claimed is:

1. A printing apparatus comprising:
a first acquisition section that acquires first printing data;
a first storage controller that causes the first printing data acquired by the first acquisition section to be stored into a first storage section;
a first conversion section that retrieves, from the first storage section, the first printing data stored into the first storage section on a first-in first-out basis, and converts, for each set of n lines among lines included in a text document represented by the first printing data, n being a predetermined number larger than or equal to 1, the retrieved first printing data into first image data in accordance with a printing setting in order in which the first printing data is retrieved;
a first deletion controller that, at timing when printing of the first image data is started, deletes, from the first storage section, converted first printing data corresponding to the first image data; and
a first printing setting controller that, when the printing setting is changed during the printing of the first image data, causes the first conversion section to convert converted first printing data stored in the first storage section, in accordance with the changed printing setting,
wherein, the first acquisition section, the first storage controller, and the first conversion section operate without pause during the first deletion controller and the first printing setting controller operating.

2. The printing apparatus according to claim 1, further comprising:
a second storage controller that causes the first image data to be stored into a second storage section; and
a second deletion controller that, at timing when the printing setting is changed during the printing of the first image data, deletes, from the second storage section, first image data, which is stored in the second storage section and which is not subjected to printing.

3. The printing apparatus according to claim 1, further comprising:
a first selection section that selects either a first printing setting change mode configured to change, for the set of n lines, the printing setting or a second printing setting change mode configured to change, for each page, the printing setting; and a second printing setting controller that, when the second printing setting change mode is selected by the first selection section, detects a page break command from converted first printing data stored into the first storage section, and causes the change of the printing setting to be reflected from a page subsequent to the detected page break command, wherein when the first printing setting change mode is selected by the first selection section, the first printing setting controller causes the change of the printing setting to be reflected for the set of n lines.

4. A printing method comprising:

acquiring first printing data;

causing the first printing data acquired in the acquiring first printing data to be stored into a first storage section;

retrieving, from the first storage section, the first printing data stored into the first storage section on a first-in first-out basis, and converting, for each set of n lines, n being a predetermined number larger than or equal to 1, the retrieved first printing data into first image data in accordance with a printing setting in order in which the first printing data is retrieved;

deleting, at timing when printing of the first image data is started, from the first storage section, converted first printing data corresponding to the first image data; and causing, when the printing setting is changed during the printing of the first image data, in the converting the retrieved first printing data, converted first printing data stored in the first storage section to be converted, in accordance with the changed printing setting.

* * * * *